US007913076B2

(12) United States Patent  
Evans et al.

(10) Patent No.: US 7,913,076 B2  
(45) Date of Patent: Mar. 22, 2011

(54) METHOD FOR CHANGING THE CONFIGURATION OF A MEDIA DRIVE APPARATUS, COMPUTER READABLE MEDIUM, AND MEDIA DRIVE APPARATUS

(75) Inventors: Nigel Ronald Evans, Bristol (GB); Tony Martyn Haworth, Bristol (GB); Shiraz Billimoria, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 11/958,802

(22) Filed: Dec. 18, 2007

(65) Prior Publication Data

US 2008/0316650 A1    Dec. 25, 2008

(30) Foreign Application Priority Data

Jun. 20, 2007    (GB) .................................. 0711860.7

(51) Int. Cl.  
*G06F 15/177* (2006.01)
(52) U.S. Cl. .................................. 713/100; 713/1; 713/2
(58) Field of Classification Search .................. 713/1, 2, 713/100  
See application file for complete search history.

(56) References Cited

U.S. PATENT DOCUMENTS

| 5,542,082 | A | * | 7/1996 | Solhjell | 711/115 |
| 5,968,141 | A | * | 10/1999 | Tsai | 710/14 |
| 5,970,511 | A | * | 10/1999 | Kurita et al. | 711/202 |
| 6,321,979 | B1 | * | 11/2001 | Hanagata | 235/375 |
| 7,146,609 | B2 | | 12/2006 | Thurston et al. | |
| 7,233,559 | B2 | * | 6/2007 | Tanimukai et al. | 369/53.37 |
| 7,376,943 | B2 | * | 5/2008 | Lu | 717/168 |
| 7,624,452 | B2 | * | 11/2009 | Young et al. | 726/30 |
| 2004/0213106 | A1 | | 10/2004 | Pereira | |
| 2006/0007815 | A1 | | 1/2006 | Erickson et al. | |

FOREIGN PATENT DOCUMENTS

| EP | 0654730 A1 | 5/1995 |
| EP | 1403865 A1 | 8/2006 |
| WO | WO 2005/043532 A1 | 5/2005 |

* cited by examiner

*Primary Examiner* — Nitin C Patel

(57) ABSTRACT

A configuration of a media drive apparatus is stored as a plurality of configuration settings in a non volatile memory of a media drive apparatus. A removable storage medium is identified as a reconfiguration medium, and data is read from the removable storage medium, where the data includes an identifier of one configuration setting of the plurality of configuration settings and a value for the one configuration setting. The one configuration setting is updated with the value read from the removable storage medium.

22 Claims, 5 Drawing Sheets

METHOD FOR CHANGING THE CONFIGURATION OF A MEDIA DRIVE APPARATUS, COMPUTER READABLE MEDIUM, AND MEDIA DRIVE APPARATUS

CROSS-REFERENCE TO RELATED APPLICATION

This application claims priority under 35 U.S.C. §119 of United Kingdom patent application Serial No. GB 0711860.7, filed Jun. 20, 2007.

FIELD OF THE INVENTION

The present invention generally relates to the field of media drive apparatus.

BACKGROUND

Various types of removable storage media are known in the art, these include optical media such as CDs DVDs and optical tapes and magnetic media such as magnetic tapes and discs. Media drives are used to read and write data to the media.

Magnetic tape drives are used to write and read data from magnetic tape media. The operation of a tape drive is controlled by firmware. The firmware includes programs and functions that control the operation of the drive and configuration data that stores the settings of the drive.

In U.S. Pat. No. 6,321,979 computer readable magnetic tape medium for automatically updating the firmware of a magnetic tape apparatus is disclosed. The magnetic tape drive has a firmware memory containing firmware, and a controller for controlling the drive by executing the firmware. The controller causes the magnetic tape apparatus to read a volume identifier mark data from a magnetic tape and to detect a volume identifier contained in the volume identifier mark. The controller causes the magnetic tape apparatus to determine that the data is firmware if the volume identifier contains a control code. The controller causes the magnetic tape apparatus to overwrite the firmware memory of the magnetic tape drive apparatus if the data is firmware.

SUMMARY OF INVENTION

In accordance with an embodiment of the present invention there is provided a method for changing the configuration of a media drive apparatus using a removable storage medium. The configuration of the media drive apparatus is stored as a plurality of configuration settings in a first non-volatile memory of the media drive apparatus. The method comprises recognizing the removable storage medium as a reconfiguration medium, reading data from the removable storage medium, the data comprising an identifier of one configuration setting of the plurality of configuration settings and a value for the one configuration setting, and storing the value read from the removable storage medium in the non-volatile memory of the media drive apparatus.

BRIEF DESCRIPTION OF THE DRAWINGS

In the following, embodiments of the invention will be described, by way of example only, and with reference to the drawings in which.

DETAILED DESCRIPTION

Figure 1:
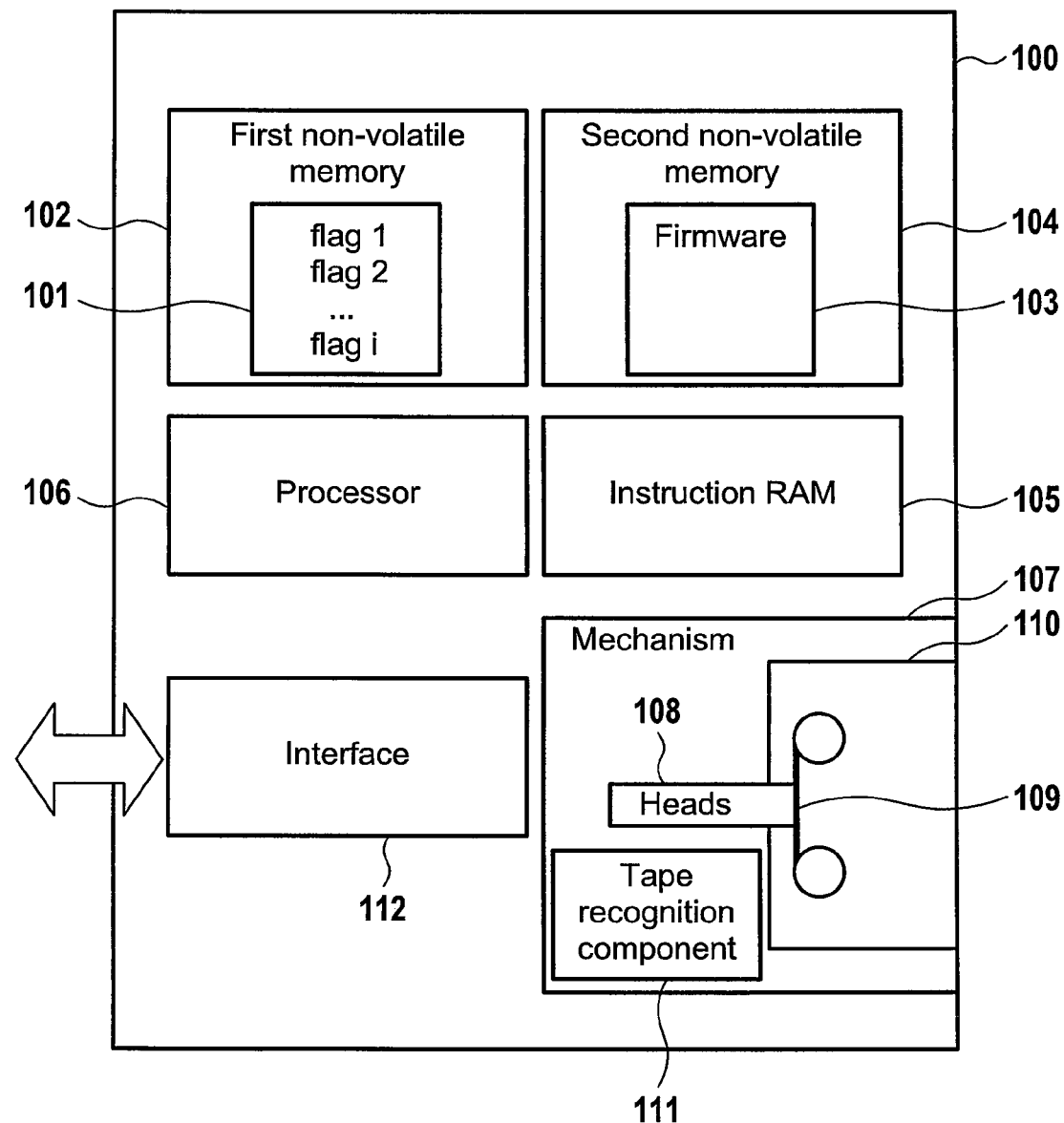
FIG. 1 is a block diagram showing a tape drive apparatus.

FIG. 1 illustrates a block diagram of a tape drive apparatus 100. The configuration of the tape drive apparatus 100 is stored as a plurality configuration settings shown in FIG. 1 as flags 101 in a first non-volatile memory 102. The configuration settings are used to determine the functioning of the tape drive apparatus by the firmware 103 which is stored in a second non-volatile memory 104. The first non-volatile memory 102 and the second non-volatile memory 104 are memory components such as EEPROM or flash memory. The first non-volatile memory 102 and the second non-volatile memory 104 may be realized as separate components or alternatively, they may be realized with both being in the same physical memory chip. In operation, the firmware 103 may be loaded into the instruction RAM 105 and executed on the processor 106. The tape drive apparatus further comprises a mechanism 107 comprising heads 108 for reading and writing onto tape media 109. The tape media 109 is contained within a housing 110. The mechanism may also comprise a tape recognition component 111. The tape drive apparatus 100 also comprises an interface 112 through which the tape drive apparatus 100 receives data and commands either from an attached computer or via a network.

In operation, the tape drive apparatus 100 loads the firmware 103 into instruction RAM 105 at boot up. The firmware 103 is then executed on the processor 106 from the instruction RAM 105. Alternatively, the processor 106 may execute the firmware 103 directly from the second non-volatile memory 104. During boot up, the configuration of the drive is determined by the firmware 103 from the configuration settings shown in FIG. 1 as flags 101 stored in the first non-volatile memory 102. The configuration settings may be Boolean flags which determine whether various functions of the drive are enabled or disabled. For example the flags may determine whether disaster recovery is enabled. The flags may also control changes to the firmware to give customer specific configurations, they may determine how the drive behaves in the event that an expired cleaning cartridge is inserted into the drive; the drive may either keep hold of the expired cartridge and given an indication, or eject the expired cartridge. The flags may also determine whether data compression is enabled at power on. The configuration settings may also contain system collaboration data such as the correct tape tensions for different manufacturers, the tape formats usable by the drive, and the currents and parameters for read and write operations. Once the drive has booted up, and a tape has been inserted in the mechanism 107, the tape drive apparatus 100 will respond to commands submitted through the interface 112 which may be to read or write data onto a tape medium 109.

Figure 2:
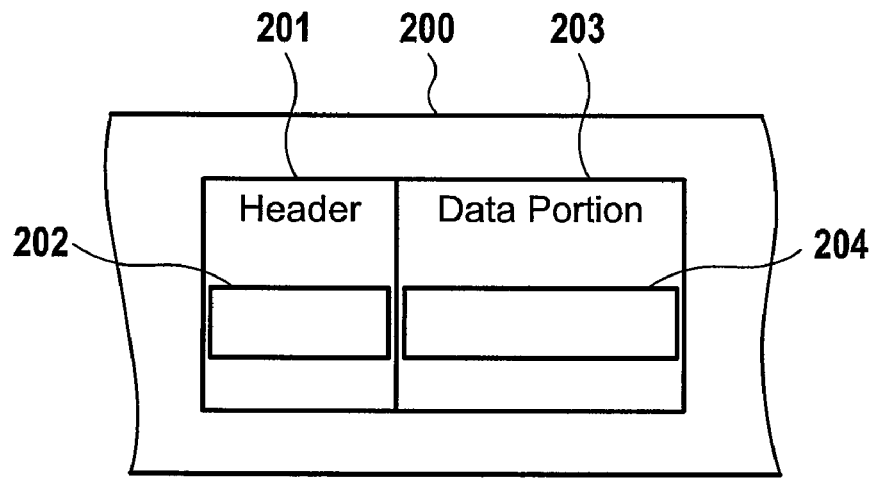
FIG. 2 is a fragmentary view of a tape medium.

FIG. 2 shows a schematic of a tape medium 200. The tape medium 200 has a header portion 201 containing a system log 202 and a data portion 203 containing data 204. According to an embodiment of the present invention the system log 202 contains an indication that the tape medium 200 is a reconfiguration tape. The data 204 contains the identifiers of configuration settings and values to which the configuration settings are to be set.

Figure 3:
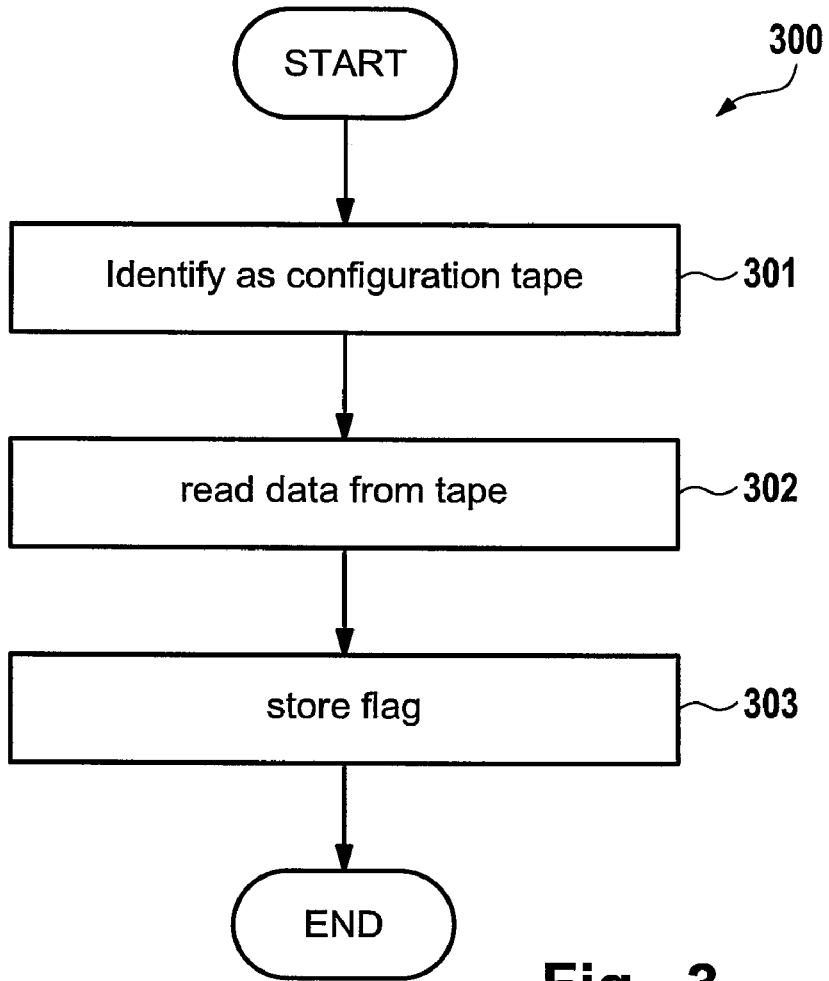
FIG. 3 is a flow diagram illustrating steps involved in reconfiguring a tape drive apparatus.

FIG. 3 shows a mode of operation for the tape drive apparatus 100 when a tape medium 200 is inserted into the mechanism 107. When a tape is inserted into the mechanism 107, the tape may automatically be rewound to the beginning of the tape and then played for a certain distance in order to read the header 201 contained on the tape 200. When the header is read, the system log 202 contains an indication that the tape is a reconfiguration tape. Alternatively, the tape may be identified as a reconfiguration tape in step 301 by the tape recognition component 111. The tape recognition component may identify the tape as a reconfiguration tape by interrogating an information source contained on the housing of the tape such as a barcode or a radio frequency identifier or a mechanical identifier such as a tab on the tape. Once the tape has been identified as a configuration tape, data 204 is read from the data portion of the tape 203 in step 302. The data read from the data portion of the tape contains the identifier of a configuration setting and a value to which the configuration setting is to be set. The firmware 103 contains instructions which when executed on the processor 106 cause the new value of the configuration setting to be written into the first non-volatile memory 102, for example by setting a new value of flag 101. Once the new values of the configuration settings are written to the non-volatile memory, the tape drive apparatus may reboot automatically.

Figure 4:
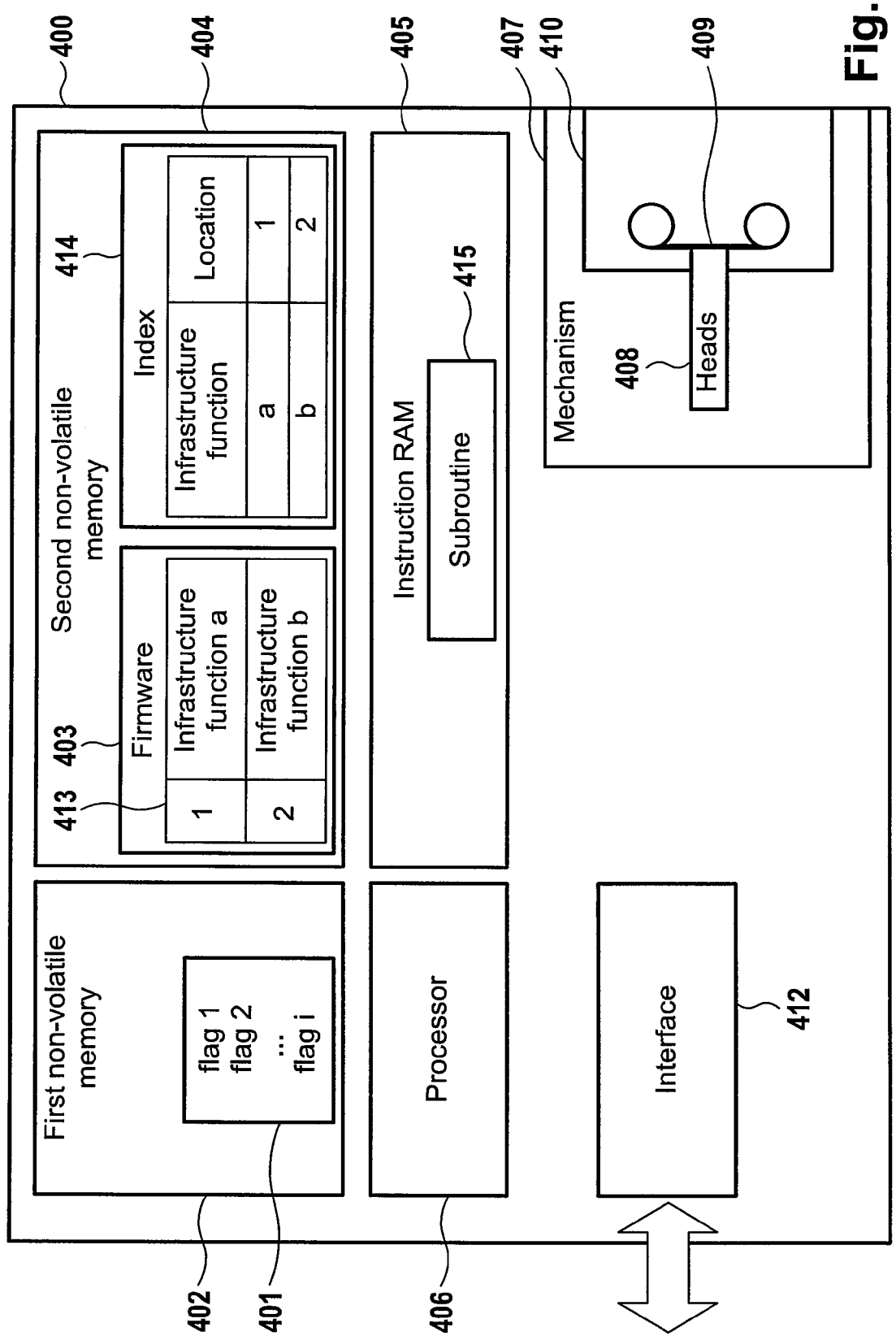
FIG. 4 is a block diagram showing a tape drive apparatus.

FIG. 4 shows a tape drive apparatus 400. The configuration of the tape drive apparatus 400 is stored in a number of configuration settings, shown as flags 401 which are stored in a first non-volatile memory 402. The configuration settings control a configuration of the tape drive apparatus 400 in the same manner as the flags 101 control the configuration of the tape drive apparatus 100. The tape drive apparatus 400 also comprises a second non-volatile memory 404, the second non-volatile memory contains firmware 403 which includes a number of infrastructure functions 413. The infrastructure functions 413 are used for amending the values of the configuration settings. The second non-volatile memory 404 further comprises an index 414 which indicates the locations in the second non-volatile memory of the infrastructure functions 413. The first non-volatile memory 402 and the second non-volatile memory 404 may be contained within the same memory chip or may be separate memory chips. The memory chips may for example be flash or EEPROM chips. The other features of the tape drive apparatus 400 function in the same way as the analogous features in tape drive apparatus 100. The instruction RAM 405 contains a sub-routine 415. The sub-routine functions to re-write the flags 401 stored in the first non-volatile memory 402. The functioning of the sub-routine is described below.

The configuration settings of tape drive apparatus 400 shown in FIG. 4 as flags 401 in the non-volatile memory 402 may be stored as multiple copies having multiple locations in the non-volatile memory. The amendment of the configuration settings may require infrastructure functions 413 from part of the firmware 403 stored in the second non-volatile memory 404.

Figure 5:
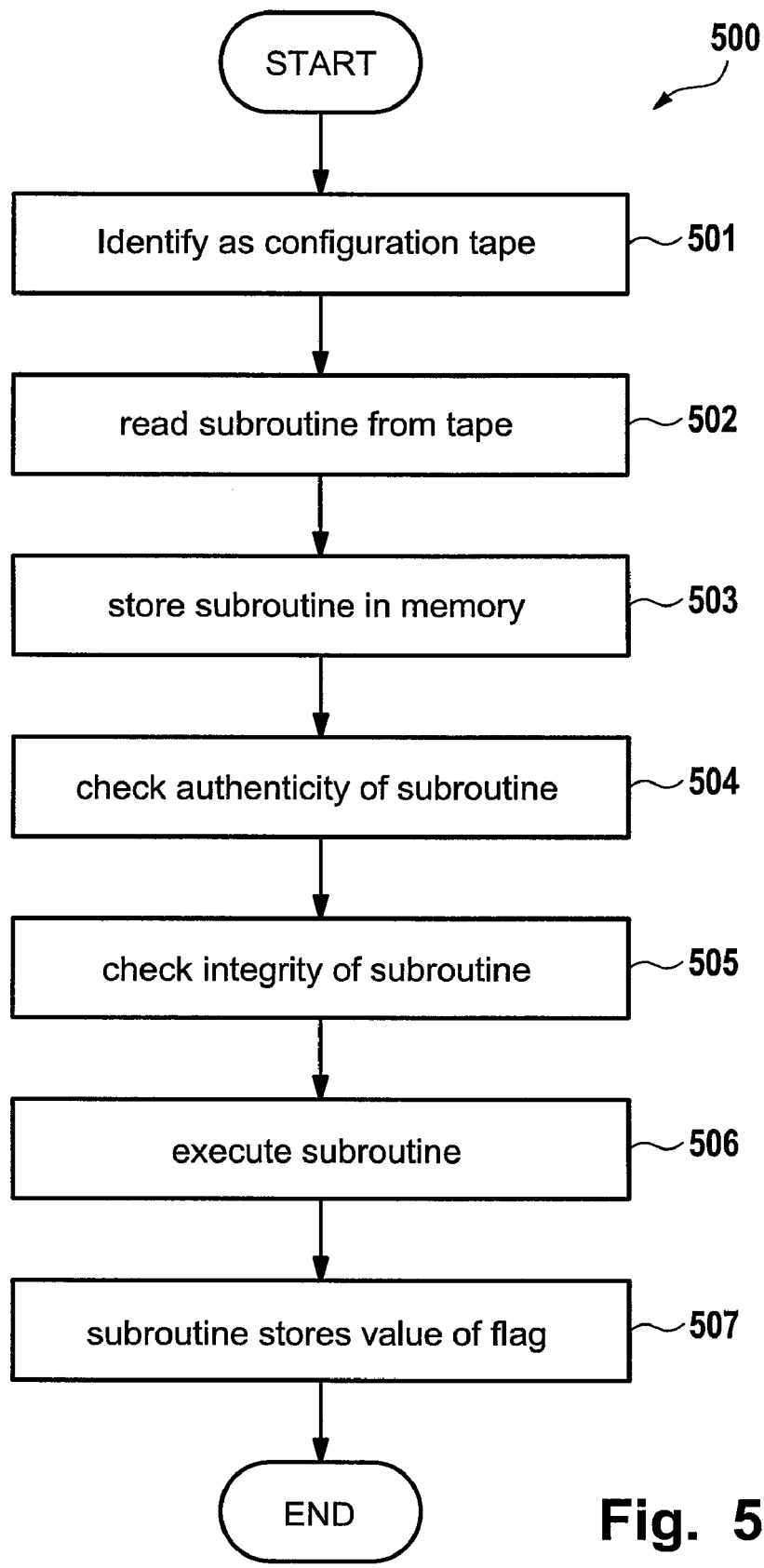
FIG. 5 is a flow diagram showing the steps involved in reconfiguring a tape drive apparatus.

FIG. 5 shows a flow diagram of a method for reconfiguration of a tape drive apparatus 400 by changing the flags 401 using a sub-routine contained on a tape medium. In step 501 the tape medium is identified as a configuration tape. This is done in the same manner as in step 301 of method 300, for example by reading the system log 200 contained in the header 201 of the tape medium 200. In step 502, the sub-routine is read from the tape. In this embodiment, the data portion of the tape 203 contains the sub-routine as data 204. In step 503, the sub-routine is stored in the instruction RAM 405 of the tape drive apparatus 400. FIG. 4 shows the sub-routine 415 stored in the instruction RAM 405 of the tape drive apparatus 400. In step 504, the authenticity of the sub-routine is checked. This involves a symmetric or asymmetric cryptographic technique for determining the authenticity. For example, the sub-routine could be digitally signed by the manufacturer of the tape drive apparatus 400. This would involve the tape drive manufacturer calculating a hash code of the sub-routine, and encrypting the hash code with the private key of the tape drive manufacturer. The encrypted hash code would then be stored on the reconfiguration tape, and read from the reconfiguration tape and stored in the instruction RAM of the tape drive apparatus 400. The authenticity of the sub-routine could then be checked by the tape drive apparatus 400 by decrypting the encrypted hash code using the public key of the tape drive manufacturer, and comparing the decrypted hash code with a hash code calculated from the sub-routine loaded into the instruction RAM. In step 505, the integrity of the sub-routine is checked. This involves checking whether the sub-routine has been correctly loaded into the memory. This is done using a redundancy check, such as checking whether a checksum calculated from the sub-routine in the memory is consistent with a checksum on the tape, or by performing a cyclic redundancy check. Additionally it may be checked whether the subroutine will return to the firmware code after it has executed. In step 506, the sub-routine is executed. In step 507, the sub-routine stores the value of a flag into the first non-volatile memory 402. The operation of the sub-routine 415 is shown in more detail in FIG. 6.

Figure 6:
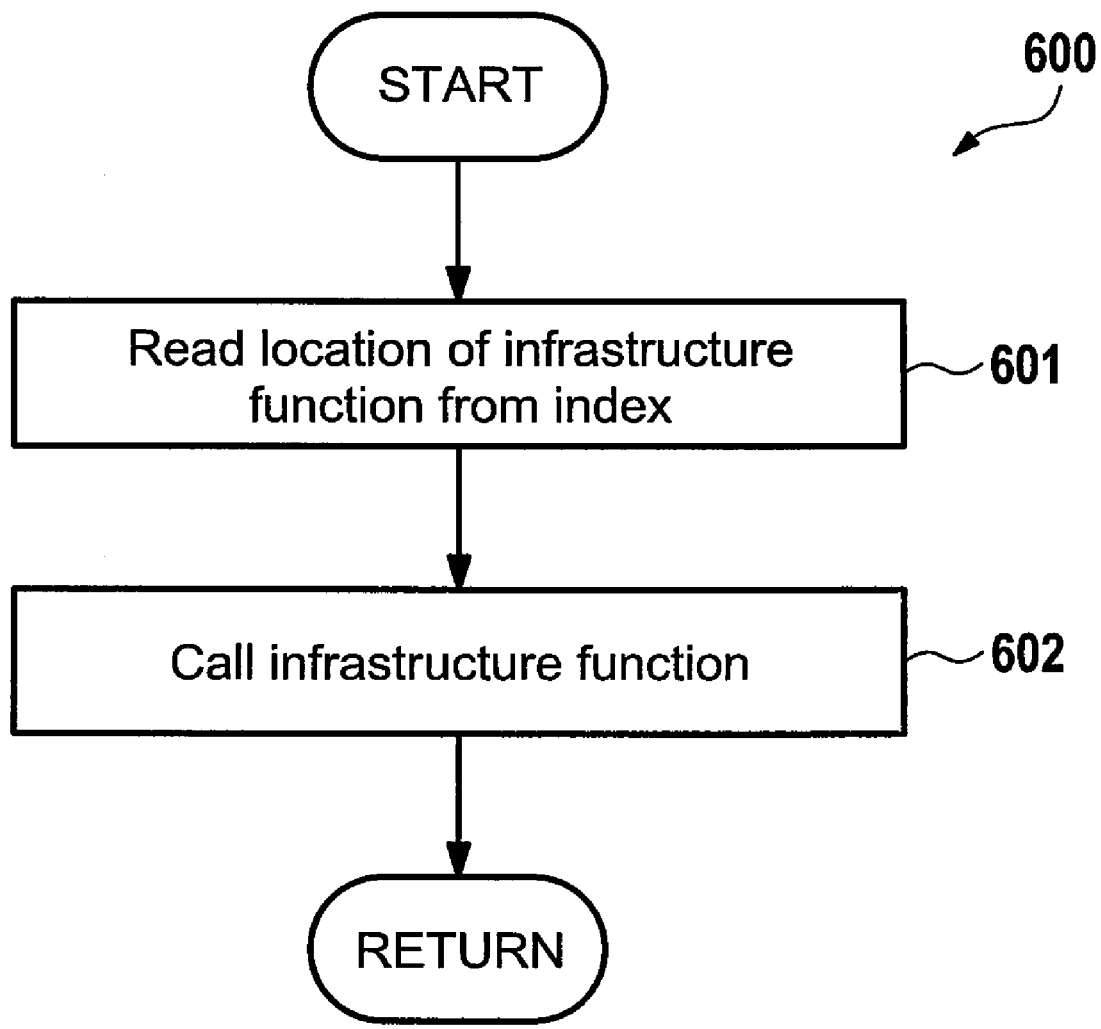
FIG. 6 is a flow diagram illustrating the steps carried out by a sub-routine for reconfiguring a tape drive apparatus.

FIG. 6 shows the operation of the sub-routine. When executed on the processor 406, the sub-routine performs step 601, in which the location of an infrastructure function is read from the index 414. In step 602, the infrastructure function is called from the location in the index. When calling the infrastructure function in step 602, the sub-routine will include a value to which a flag 401 is to be set. Once the subroutine has set the flag to the required value, it will return to the firmware program running on the processor.

In an embodiment of the invention, infrastructure functions 413 include the functionality to determine the model number or product type of the tape drive apparatus 400. The subroutine determines the model number or product type by calling the relevant infrastructure functions. The configuration settings to be stored by the subroutine are modified by the subroutine dependent on the product type. The subroutine then calls an infrastructure function in order to set the configuration setting to the value.

The foregoing description has been presented for the purposes of illustration. It is not exhaustive and does not limit the invention to the precise forms or embodiments disclosed. Modifications and adaptations of the invention will be apparent to those skilled in the art from consideration and practice of the disclosed embodiments of the invention. For example, the disclosed embodiments of the invention include tape drive apparatus but methods and apparatus consistent with the invention may be implemented as another kind of media drive apparatus. One skilled in the art will recognize that a media drive apparatus may be implemented as a magnetic media drive such as a removable hard disk or magnetic tape drive or an optical drive such as optical tape, CD or DVD drive.

| List of Reference Numerals | |
| --- | --- |
| 100 | Tape drive apparatus |
| 101 | Flags |

-continued

| List of Reference Numerals | |
|---|---|
| 102 | First non-volatile memory |
| 103 | Firmware |
| 104 | Second non-volatile memory |
| 105 | Instruction RAM |
| 106 | Processor |
| 107 | Mechanism |
| 108 | Heads |
| 109 | Tape media |
| 110 | Housing |
| 111 | Tape recognition component |
| 112 | Interface |
| 200 | Tape Medium |
| 201 | Header portion |
| 202 | System Log |
| 203 | Data portion |
| 204 | Data |
| 300 | Method |
| 301 | Identify as configuration tape |
| 302 | Read data from tape |
| 303 | Store flag |
| 400 | Tape drive apparatus |
| 401 | Flags |
| 402 | First non-volatile memory |
| 403 | Firmware |
| 404 | Second non-volatile memory |
| 405 | Instruction RAM |
| 406 | Processor |
| 407 | Mechanism |
| 408 | Heads |
| 409 | Tape media |
| 410 | Housing |
| 412 | Interface |
| 413 | Infrastructure function |
| 414 | Index |
| 415 | Subroutine |
| 500 | Method |
| 501 | Identify as configuration tape |
| 502 | Read subroutine from tape |
| 503 | Store subroutine in memory |
| 504 | Check authenticity of subroutine |
| 505 | Check integrity of tape |
| 506 | Execute subroutine |
| 507 | Subroutine stores value of flag |
| 600 | Subroutine |
| 601 | Read location of infrastructure function from index |
| 602 | Call infrastructure function |

The invention claimed is:

1. A method for changing a configuration of a media drive apparatus using a removable storage medium, the configuration of the media drive apparatus being stored as a plurality of configuration settings in a first non volatile memory of the media drive apparatus, the method comprising
identifying the removable storage medium as a reconfiguration medium;
reading data from the removable storage medium, the data comprising an identifier of a particular one of the plurality of configuration settings and a value for the particular configuration setting, wherein the plurality of configuration settings are distinct from firmware in the media drive apparatus;
updating, by instructions of the firmware executing on a processor, the particular configuration setting in the first non volatile memory of the media drive apparatus with the value read from the removable storage medium.

2. The method of claim 1, wherein the removable storage medium comprises a system log section, the system log section indicating a type of removable storage medium, wherein identifying the removable storage medium as a reconfiguration medium comprises reading the system log section.

3. The method of claim 1, wherein updating the particular configuration setting does not involve updating the firmware.

4. The method of claim 1, wherein the plurality of configuration settings are selected from the group consisting of a configuration setting to indicate whether disaster recovery is enabled or disabled; a configuration setting to determine behavior of the media drive apparatus upon insertion of an expired cleaning removable storage medium; a configuration setting to indicate whether data compression is enabled or disabled; and a configuration setting to indicate a storage medium format supported by the media drive apparatus.

5. A method for changing a configuration of a media drive apparatus using a removable storage medium, the configuration of the media drive apparatus being stored as a plurality of configuration settings in a first non volatile memory of the media drive apparatus, the method comprising
identifying the removable storage medium as a reconfiguration medium;
reading data from the removable storage medium, the data comprising an identifier of one configuration setting of the plurality of configuration settings and a value for the one configuration setting;
storing the value read from the removable storage medium in the first non volatile memory of the media drive apparatus;
reading a subroutine from the removable storage medium, the subroutine comprising instructions to store a value for the one configuration setting; and
storing the subroutine on the media drive apparatus, wherein storing the value read from the removable storage medium in the first non volatile memory of the media drive apparatus comprises executing the subroutine on a processor in the media drive apparatus.

6. The method of claim 5, the media drive apparatus having a firmware component stored in a second non volatile memory, the firmware component comprising an infrastructure function and an index, the index indicating a location in the second non volatile memory of the infrastructure function, the method further comprising
reading the location of the infrastructure function from the index;
calling the infrastructure function by execution of the subroutine on the processor.

7. The method of claim 6, the infrastructure function being operable to determine an identifier of a product type of the media drive apparatus, the method further comprising
modifying the identifier of the one configuration setting and modifying the value for the one configuration setting depending on the identifier of the product type of the media drive apparatus.

8. The method of claim 5 further comprising
checking an integrity and/or authenticity of the subroutine.

9. A non-transitory computer readable medium comprising instructions which when executed on a processor of a media drive apparatus perform a reconfiguration of the media drive apparatus, the reconfiguration of the media drive apparatus comprising:
recognizing a removable storage medium inserted in the media drive apparatus as a reconfiguration medium;
reading data from the reconfiguration medium, the data comprising an identifier of a particular one of a plurality of configuration settings and a value for the particular configuration setting, wherein the plurality of configuration settings define a configuration of the media drive apparatus;
reading a routine from the reconfiguration medium; and executing the routine on the processor of the media drive apparatus to update the particular configuration setting in a non volatile memory of the media drive apparatus with the value read from the reconfiguration medium.

10. The computer readable medium of claim 9, the reconfiguration of the media drive apparatus further comprising:
storing the routine in a memory of the media drive apparatus; and
performing a redundancy check on the routine stored in the memory of the media drive apparatus.

11. The computer readable medium of claim 9, the reconfiguration of the media drive apparatus further comprising:
checking that the routine will return.

12. The computer readable medium of claim 9, wherein the media drive apparatus further stores firmware, and wherein updating the particular configuration setting does not involve updating the firmware.

13. The computer readable medium of claim 12, wherein the plurality of configuration settings are distinct from the firmware, and wherein the plurality of configuration settings are selected from the group consisting of a configuration setting to indicate whether disaster recovery is enabled or disabled; a configuration setting to determine behavior of the media drive apparatus upon insertion of an expired cleaning removable storage medium; a configuration setting to indicate whether data compression is enabled or disabled; and a configuration setting to indicate a storage medium format supported by the media drive apparatus.

14. A non-transitory computer readable medium for reconfiguring a media drive apparatus, the computer readable medium comprising:
an indication that the computer readable medium is a reconfiguration medium;
data for reconfiguring the media drive apparatus, wherein the data includes an identifier of a particular one of a plurality of configuration settings and a value for the particular configuration setting, wherein the plurality of configuration settings define a configuration of the media drive apparatus; and
a routine containing instructions that upon execution by a processor in the media drive apparatus cause update of the particular configuration setting in a non volatile memory of the media drive apparatus with the value on the computer readable medium.

15. The computer readable medium of claim 14, being a tape medium.

16. The computer readable medium of claim 15, the indication being part of a system log portion of the tape medium.

17. The computer readable medium of claim 14, the routine further comprising instructions to look up a location of an infrastructure function in an index stored on the media drive apparatus and to call the infrastructure function.

18. A media drive apparatus comprising:
a processor;
a first non volatile memory comprising a number of configuration settings indicating a configuration of the media drive apparatus;
a second non volatile memory comprising firmware;
wherein the processor is configured to:
determine that a removable storage medium in the media drive apparatus is a reconfiguration medium;
in response to determining that the removable storage medium is the reconfiguration medium, read data and a routine from the removable storage medium, the data comprising an identifier of a particular one of a plurality of configuration settings and a value for the particular configuration setting, wherein the plurality of configuration settings define a configuration of the media drive apparatus; and
execute the routine to cause update of the particular configuration setting in the first non volatile memory with the value read from the removable storage medium.

19. The media drive apparatus of claim 18, the firmware comprising an infrastructure function for assigning a value to one of the plurality of configuration settings and an index portion indicating a location of the infrastructure function, wherein the routine upon execution calls the infrastructure function.

20. The media drive apparatus of claim 18, being a tape drive and further comprising a tape recognition component for checking a property of a housing of the removable storage medium to recognize the removable storage medium as a reconfiguration tape.

21. The media drive apparatus of claim 18, wherein the update of the particular configuration setting does not involve updating the firmware.

22. The media drive apparatus of claim 18, wherein the media drive apparatus further stores firmware, and wherein the plurality of configuration settings are selected from the group consisting of a configuration setting to indicate whether disaster recovery is enabled or disabled; a configuration setting to determine behavior of the media drive apparatus upon insertion of an expired cleaning removable storage medium; a configuration setting to indicate whether data compression is enabled or disabled; and a configuration setting to indicate a storage medium format supported by the media drive apparatus.

* * * * *